Patented June 28, 1938

2,122,277

UNITED STATES PATENT OFFICE 2,122,277

PREPARATION OF RESINS

Bozetech C. Bren, Verona, N. J., assignor to E. I. du Pont de Nemours & Company, Wilmington, Del., a corporation of Delaware No Drawing. Application September 9, 1936, Serial No. 99,963

11 Claims. (Cl. 260—2)

This invention relates to the preparation of resins and, more particularly, to the neutralization of acid used as a catalyst in the preparation of polyvinyl acetal resins.

Heretofore, polyvinyl acetal resins have been prepared and they have proved to have properties highly useful for various commercial applications. These acetals may be prepared directly from polyvinyl alcohol by reacting same with an aldehyde to give the acetal or may be made by hydrolyzing a polyvinyl ester and reacting the hydrolysis product, either simultaneously or subsequently to the hydrolysis step, with an aldehyde to give an acetal. The various ways of preparing these acetals are shown in Morrison U. S. Patent 2,036,092, granted March 31, 1936 or French Patent 792,661. Depending upon the degree of condensation of the aldehyde with the polyvinyl alcohol in the acetal reaction, or upon the degree of hydrolysis of the polyvinyl ester and the degree of condensation of the hydrolysis product thereof with aldehyde in the acetal reaction, partial polyvinyl acetals of varying properties may be prepared. In all instances an acid is used as a catalyst for the reaction with the aldehyde to give the acetal.

The term "polyvinyl acetal" is used herein to denote a polyvinyl compound containing some acetal groups but not necessarily excluding all OH groups or acidyl groups. For example, even in the polyvinyl acetals made directly from polyvinyl alcohol, an appreciable proportion of OH groups are generally left unreacted with aldehyde as a resin of more desirable properties for some purposes is obtained in this way; where the polyvinyl acetal is being made by hydrolysis of a polyvinyl ester, the hydrolysis is usually not carried to completeness so that some acidyl groups remain in the final resin as well as OH groups if the hydrolysis product is not completely reacted with the aldehyde.

The polyvinyl acetals, as heretofore prepared, have exhibited physical properties which make them potentially valuable as the chief ingredients in the plastic interlayers used for safety glass. Commercially, however, their utility has been seriously restricted by the defects of imperfect clarity and lack of freedom from color and stability towards light and heat.

An object of the present invention is to effect improvements in these polyvinyl acetal resins with respect to their transparency, their color and their stability towards light and heat. A further object is to effect such improvement without substantial deviation from the technique of manufacture heretofore known, particularly with respect to the sequence of operations and the type of equipment used. A further object is to provide a method of preparing a polyvinyl acetal resin having highly acceptable properties for use as interlayer material in laminated glass.

The above objects are accomplished according to the present invention by neutralizing the acid used as catalyst in the acetal reaction with a water-insoluble alkyl or alkyl-alicyclic secondary or tertiary amine while the resin is in solution. More specifically, a solution of polyvinyl acetal resin, either formed in the preparation of the resin or prepared by dissolving the resin after it has been precipitated, is treated with the amine in quantity at least sufficient to neutralize the acid used as catalyst in the acetal reaction and the resin is thereafter precipitated from solution and washed.

It has been discovered that the defects noted above in the acetal resins heretofore known, are largely, if not altogether, due to improper or inadequate neutralization of the acid used as the catalyst in the acetal reaction. Further, that neutralization of such acid by the water-insoluble alkyl or alkyl-alicyclic secondary or tertiary amines while the resin is in solution may be readily carried out and substantially completely eliminates such defects in the acetal resins as heretofore encountered.

Ordinarily the polyvinyl acetals are formed by reacting a polyvinyl compound containing hydroxyl groups, and this compound may be either polyvinyl alcohol or a partially or substantially completely hydrolyzed polyvinyl ester, in a liquid solvent medium and the polyvinyl acetal formed by the reaction is subsequently precipitated. It is convenient to carry out the neutralization of the acid catalyst while the polyvinyl acetal is dissolved in the liquid medium. In many instances this liquid solvent medium comprises a substantial proportion of weak organic acid, generally acetic acid. On the other hand, the acids used as catalysts in the acetal reaction are relatively strong acids and usually mineral acids; among such acids may be mentioned sulphuric, hydrochloric, para toluene sulphonic, benzene sulphonic and camphor sulphonic acids.

It will be noted that the stronger acid used as a catalyst will be neutralized by the amines first even if the liquid reaction medium comprises acetic acid or the like and only if excess of the amine is used, will the weaker acid be neutralized and then only to the extent the amine is present in excess of that required to neutralize the acid used as catalyst. Neutralization of the acetic acid or other weak organic acid comprising the liquid solvent medium is not necessary as such acid has been found to have no deleterious effect upon the final resin product.

In the following examples are illustrated specific embodiments of the invention, parts being given by weight throughout:

*Example 1.*—Nine batches of a polyvinyl acetal resin which was specifically a polyvinyl formal resin, i. e., polyvinyl acetate was partially hydrolyzed and part of the hydroxyl groups formed were reacted with formaldehyde to give formal groups, were made as follows:

A mixture was made of

| | Parts |
|---|---|
| Glacial acetic acid | 150 |
| Distilled water | 50 |
| 37% formalin | 165 | and to it was added

| | |
|---|---|
| Poylvinyl acetate | 350 |

This mixture was heated to 70° C. with stirring, and a homogeneous solution was thereby formed.

To this was now added, with stirring, a mixture containing

| | Parts |
|---|---|
| Glacial acetic acid | 50 |
| Distilled water | 85 |
| Sulphuric acid (sp. gr. 1.84) | 15 | and stirring was continued for one hour.

Each batch was then allowed to stand for 19 hours at 70° C.

The nine batches were then subjected to neutralizing treatments and precipitation by a common procedure but with different reagents, as enumerated below. The procedure was as follows:

To the batch, still at 70° C. was added the neutralizing reagent, with stirring continued long enough to effect thorough distribution of the latter. The mixture was then extruded through fine orifices into distilled water at about 60° C. The filaments so formed were allowed to remain in contact with this water for about an hour, and then washed in three changes of cold distilled water. They were then dried at 70° C. for 24 hours. Solutions of the dried resin, 10% in dioxan, were water white and of exceptional clarity. Further, exposure tests of the resin in each instance showed it was stable to light and heat over prolonged periods.

| Batch No. | Reagent | Parts |
|---|---|---|
| 1 | Diethyl cyclohexylamine | 24 |
| 2 | Dimethyl cyclohexylamine | 19.7 |
| 3 | Triamylamine | 36 |
| 4 | ----do---- | 70 |
| 5 | Tributyl amine | 29 |
| 6 | Ethyl cyclohexylamine | 20 |
| 7 | Methyl cyclohexylamine | 18 |
| 8 | Diisobutyl amine | 20 |
| 9 | Diamyl amine | 25 |

Other examples of carrying out the present invention are given below:

*Example 2.*—Batches of resin are made up as in Example 1 and treated with the same amounts of the same neutralizing agents, the only difference being that 18 parts of para toluene sulphonic acid are used as the catalyst in the acetal reaction rather than the 15 parts of sulphuric acid. Comparable results are obtained.

*Example 3.*—A batch of resin mixture identical with those made in Example 1 is subjected to neutralizing treatment and precipitation as follows:

There is added to the batch, with stirring, 24 parts of diethyl cyclohexylamine. After this has been thoroughly distributed, the mixture is diluted with its own volume of dilute alcohol (ethyl alcohol (92.4% by weight) 65 parts by volume, water 35 parts by volume). To this diluted mixture, at 45° C., is added, with stirring, three-quarters of its volume of water at room temperature. The resin is thereby precipitated and is subsequently washed and dried as in Example 1.

*Example 4.*—To 500 parts of a vinyl acetate—acetaldehyde resin (obtained by the reaction of vinyl acetate and acetaldehyde in proportions of 100 to 3, in accordance with U. S. P. 1,725,362), dissolved in 1000 parts ethyl alcohol, is added 240 parts of 37% aqueous formaldehyde solution and 12 parts concentrated hydrochloric acid, and the mixture is heated for 14 hours at 100° C. in a closed pressure vessel. Upon completion of the reaction the mixture is cooled to about 60° C. and there is added diethyl cyclohexyl amine, 8 parts. When this has been thoroughly dissolved and distributed, the mass is spun in filaments into water, and the filaments washed and dried.

*Example 5.*—To 1000 parts of an aqueous solution of polyvinyl alcohol, containing 78 parts of polyvinyl alcohol, and at a temperature of about 15° C., is added, with vigorous stirring, 51 parts of butyraldehyde. With continued stirring there is slowly added 59 parts of aqueous hydrochloric acid of 36% strength. Stirring is continued during and throughout the precipitation from the solution of a flocculent white resin. The latter is separated from the liquid and is then dissolved in a convenient quantity of 70% aqueous ethyl alcohol. To this is added 22 parts of triamyl amine. The solution is then extruded into filaments, and washed with distilled water, as in Example 1.

In connection with Example 5 it is to be noted that the amount used of the amine is less than that necessary to neutralize all of the hydrochloric acid present in the initial reaction batch, since a majority of this acid has been carried away in the filtrate at the time of separating the resin precipitate from the reaction mixture.

*Example 6.*—A uniform solution is made of

| | Parts |
|---|---|
| Polyvinyl acetate | 100 |
| Ethyl alcohol | 42 |
| Formalin (37%) | 70 | by stirring at about 70° C. To this is added a solution of

| | Parts |
|---|---|
| Sulphuric acid (1.84 sp. gr.) | 2.67 |
| Distilled water | 17 | and stirring is continued at about 80° C. for 1.5 hours.

The resulting hot resin is then allowed to stand for 19 hours at 70° C.

A solution for neutralization and dilution is made up of

| | Parts |
|---|---|
| Diethyl cyclohexylamine | 4.14 |
| Ethyl alcohol | 140 |
| Distilled water | 73 | and into this solution, at room temperature, in a vessel provided with a cooling jacket, is stirred the hot resin mixture. The temperature of the resulting diluted resin mixture is 30 to 40° C.

Stirring is continued for a few minutes to ensure uniformity, and there is then added Parts
Distilled water---------------------------- 225

The resin is thereby precipitated, and is subsequently washed with water and dried.

*Example 7.*—Same as Example 6, except that there is used, instead of sulphuric acid, Parts
Para toluene sulphonic acid---------------- 5

It will be understood that the above examples are merely illustrative of the manner of carrying out the present invention. In the examples are disclosed a representative number of alkyl and alkyl-alicyclic secondary and tertiary amines suitable for use in the present invention; other neutralizing agents in this class include dibutyl amine and triisobutyl amine.

As the examples show, the neutralizing treatment is carried out while the resin is dissolved or dispersed, the neutralizing agent either being added to the resin prior to precipitation of the resin in its preparation or the resin is redissolved and then treated with the neutralizing agent. Where the preparation of the resin involves automatic precipitation of the resin as illustrated in Example 5, it will be necessary to redissolve the resin but in instances where the resin is not automatically precipitated, it is preferred to treat it with the neutralizing agent before the precipitation step for obvious reasons of economy.

The amount of amine used in the present invention need not be closely controlled provided that a sufficient amount is used to effect the desired neutralization of the acid used as catalyst. The minimum amount of a given amine to be used to neutralize a given amount of acid catalyst may be calculated on the basis of their respective molecular weights. Where the resin has been precipitated and redissolved, some acid catalyst will have been removed and, consequently, the amount of amine necessary for satisfactory neutralization will be somewhat less than that theoretically needed to neutralize the full amount of acid catalyst used. An excess of amine is not objectionable since it is compatible with the resin and also since it will tend to be consumed by the acetic acid or other weak organic acid usually present as a solvent in the preparation of these resins.

It will be apparent to those skilled in the art from a consideration of the specific examples and the invention that the treatment of the present invention is not restricted to any specific polyvinyl acetal. The general principle of the invention is equally applicable to polyvinyl acetals regardless of the specific aldehyde used in the acetal reaction, or percent of hydroxyl groups, acidyl groups or acetal groups in the finished resin.

By the use of the process of the present invention, it is possible to prepare polyvinyl acetal resins that are colorless or water-white, highly stable to both light and heat and of a clarity not heretofore attainable. An advantage of the invention is that it gives a positive, complete and permanent neutralization of the acid used as catalyst in the preparation of these polyvinyl acetal resins and thereby insures the production of resins of substantially perfect clarity, free from color and not susceptible to discolor by light and heat. Such resins are thus eminently suited in these respects for use in the interlayer of safety glass which is normally subjected to severe conditions of exposure to light and heat. A further advantage of the present invention is that the obvious improvements in the finished resin are obtained without substantial deviation from the normal sequence of steps in the preparation of such resins and no additional apparatus is required. The ordinary agents that would be thought of for neutralization of the acid catalyst such as ammonia or ammonium hydroxide or mineral alkalis can not be used in the treatment of these resins to give a product free of haze and hence are not suitable for the treatment of these resins where a product of high quality is necessary.

I claim:

1. In the process of preparing a polyvinyl acetal resin which comprises reacting a polyvinyl compound containing hydroxyl groups with an aldehyde in the presence of an acid as a catalyst to form the polyvinyl acetal, the step comprising neutralizing the acid used as catalyst with an amine selected from the group consisting of water-insoluble alkyl and alkyl-alicyclic secondary and tertiary amines, while the resin is in solution.

2. In the process of preparing a polyvinyl acetal resin which comprises reacting a polyvinyl compound containing hydroxyl groups with an aldehyde in the presence of an acid as a catalyst to form the polyvinyl acetal, the step comprising neutralizing the acid used as catalyst with dimethyl cyclohexyl amine while the resin is in solution.

3. In the process of preparing a polyvinyl acetal resin which comprises reacting a polyvinyl compound containing hydroxyl groups with an aldehyde in the presence of an acid as a catalyst to form the polyvinyl acetal, the step comprising neutralizing the acid used as catalyst with diethyl cyclohexyl amine while the resin is in solution.

4. In the process of preparing a polyvinyl acetal resin which comprises reacting a polyvinyl compound containing hydroxyl groups with an aldehyde in a liquid solvent medium in the presence of an acid as a catalyst to form the polyvinyl acetal, the steps comprising neutralizing the acid used as catalyst with an amine selected from the group consisting of water-insoluble alkyl and alkyl-alicyclic secondary and tertiary amines, while the resin is in solution, thereafter precipitating said polyvinyl acetal resin from said liquid solvent medium and washing said resin with water.

5. In the process of preparing a polyvinyl acetal resin which comprises reacting a polyvinyl compound containing hydroxyl groups with an aldehyde in a liquid reaction medium in the presence of an acid as a catalyst to form the polyvinyl acetal and precipitating the polyvinyl acetal from said liquid reaction medium, the steps comprising redissolving the polyvinyl acetal resin, neutralizing the residual acid used as catalyst with an amine selected from the group consisting of water-insoluble alkyl and alkyl-alicyclic secondary and tertiary amines, while the resin is in solution, and then reprecipitating the resin.

6. In the process of preparing a polyvinyl acetal resin which comprises at least partially hydrolyzing polyvinyl acetate and reacting the hydrolysis product with an aldehyde in the presence of an acid as a catalyst to form a polyvinyl acetal, the step comprising neutralizing the acid used as catalyst with an amine selected from the group consisting of water-insoluble alkyl and alkyl-alicyclic secondary and tertiary amines, while the resin is in solution.

7. In the process of preparing a polyvinyl acetal resin which comprises at least partially hydrolyzing polyvinyl acetate and reacting the hydrolysis product with a lower aliphatic aldehyde from the group consisting of formaldehyde and butyraldehyde, in the presence of an acid as a catalyst to form the polyvinyl acetal, the step comprising neutralizing the acid used as catalyst with an amine selected from the group consisting of water-insoluble alkyl and alkyl-alicyclic secondary and tertiary amines, while the resin is in solution.

8. In the process of preparing a polyvinyl acetal resin which comprises reacting a polyvinyl compound containing hydroxyl groups with an aldehyde in the presence of an acid as a catalyst to form the polyvinyl acetal, the step comprising neutralizing the acid used as a catalyst with a dialkyl cyclohexyl amine in which each alkyl group contains not more than two carbon atoms, while the resin is in solution.

9. A clear, water-white, light stable polyvinyl acetal resin obtained by reacting a polyvinyl compound containing hydroxyl groups with an aldehyde in the presence of an acid as a catalyst to form a polyvinyl acetal and neutralizing the acid used as catalyst with an amine selected from the group consisting of water-insoluble alkyl and alkyl-alicyclic secondary and tertiary amines, while the resin is in solution.

10. A clear, water-white, light stable polyvinyl acetal resin obtained by reacting a polyvinyl compound containing hydroxyl groups with an aldehyde in the presence of an acid as a catalyst to form a polyvinyl acetal and neutralizing the acid used as catalyst with a dialkyl cyclohexyl amine in which each alkyl group contains not more than two carbon atoms, while the resin is in solution.

11. A clear, water-white, light stable polyvinyl acetal resin obtained by at least partially hydrolyzing polyvinyl acetate and reacting the hydrolysis product with a lower aliphatic aldehyde from the group consisting of formaldehyde and butyraldehyde in the presence of an acid as a catalyst to form a polyvinyl acetal and neutralizing the acid used as catalyst with an amine selected from the group consisting of water-insoluble alkyl and alkyl-alicyclic secondary and tertiary amines, while the resin is in solution.

BOZETECH C. BREN.